United States Patent
Mahapatra

(10) Patent No.: US 10,484,495 B1
(45) Date of Patent: Nov. 19, 2019

(54) SYSTEM AND METHOD FOR NOTIFICATION MANAGEMENT

(71) Applicant: AMAZON TECHNOLOGIES, INC., Seattle, WA (US)

(72) Inventor: Abinash Mahapatra, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/729,517

(22) Filed: Oct. 10, 2017

(51) Int. Cl.
| | |
|---|---|
| *H04L 12/58* | (2006.01) |
| *H04L 29/08* | (2006.01) |
| *G06Q 30/00* | (2012.01) |
| *G06Q 30/06* | (2012.01) |
| *G06Q 10/08* | (2012.01) |

(52) U.S. Cl.
CPC ......... *H04L 67/26* (2013.01); *G06Q 30/0185* (2013.01); *G06Q 30/0635* (2013.01); *H04L 67/24* (2013.01); *G06Q 10/087* (2013.01)

(58) Field of Classification Search
CPC ............. G06Q 30/0226; G06Q 20/227; G06Q 30/0253; G06Q 30/0261; G06F 21/31; G06F 3/04842; G06F 3/04847; H04L 67/26; H04L 67/306
See application file for complete search history.

(56) References Cited

U.S. PATENT DOCUMENTS

| | | | | |
|---|---|---|---|---|
| 2003/0023690 A1* | 1/2003 | Lohtia | ..................... | H04L 29/06 709/206 |
| 2015/0082212 A1* | 3/2015 | Sharda | ..................... | H04L 67/26 715/764 |
| 2015/0262160 A1* | 9/2015 | Hursta | ................. | G06Q 20/227 705/14.51 |

* cited by examiner

*Primary Examiner* — Kim T Nguyen
(74) *Attorney, Agent, or Firm* — Lindauer Law, PLLC

(57) ABSTRACT

A notification management server may receive merchant data indicative of notifications that are to be sent to user devices. The notification management server may access preference data that is indicative of distribution information for distributing the notifications. Based on the preference data the notification management server may send the notifications to a particular user device and omit sending the notification to other user devices. The particular user device upon receipt of the notifications may send confirmation data. The confirmation data may indicate a presentation receipt associated with the notifications. When the notification management server does not receive the confirmation data, the notification is stored. Upon receipt of heartbeat data, the notification management server may send the stored notifications to the particular user device.

20 Claims, 9 Drawing Sheets

*Continued from FIG. 2*

SYSTEM AND METHOD FOR NOTIFICATION MANAGEMENT

BACKGROUND

Servers may send notifications to user devices, regardless of whether the user device is able to receive them. In the instances that the user device is not available the notification will never be received.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
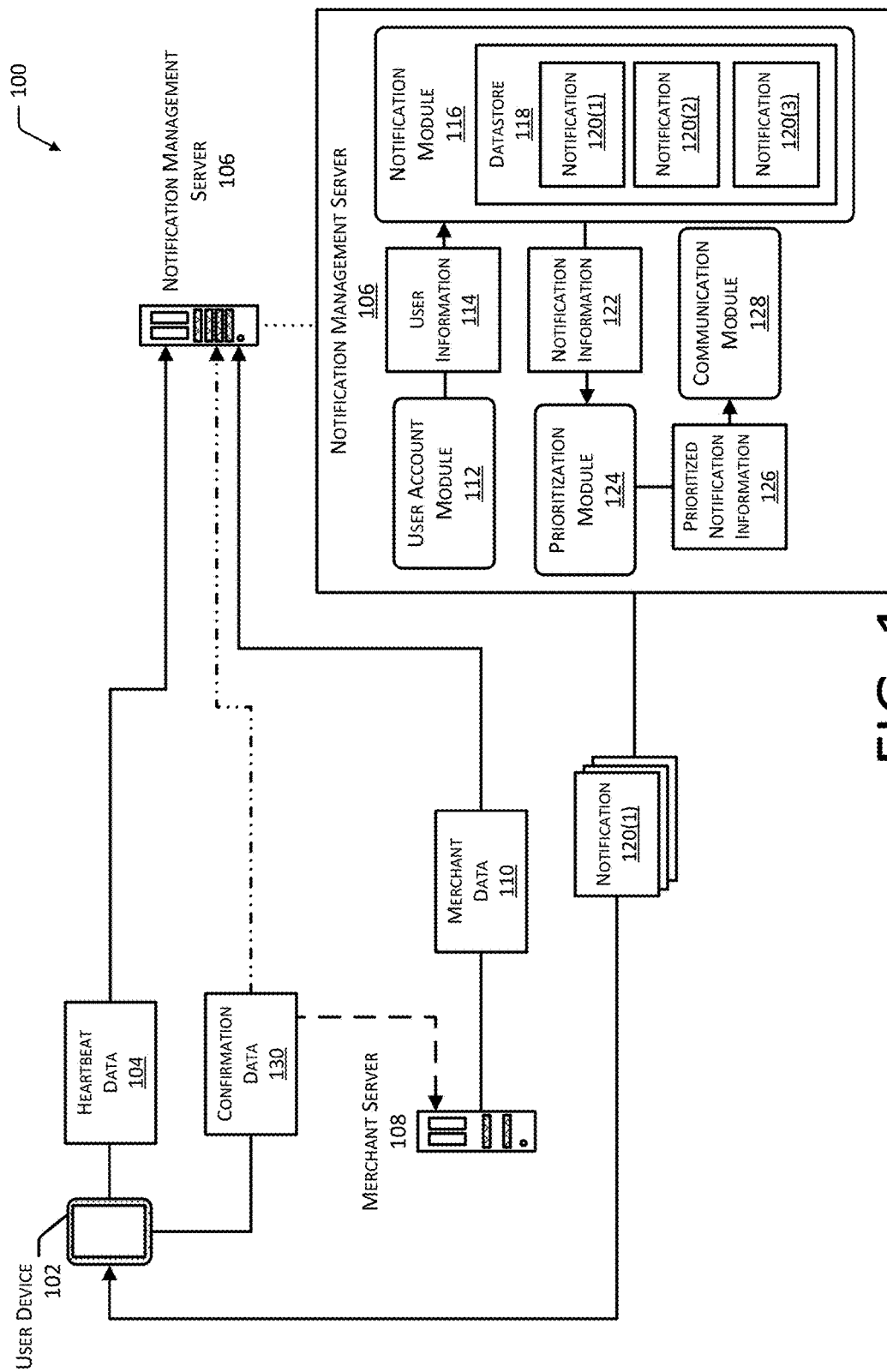
FIG. 1 depicts a schematic of a system for notification management.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

User devices may have applications installed that periodically receive notifications from notification servers or services. A notification, also called a "push notification," or a "server push notification," is the delivery of information from applications to a user device without a specific request from the user device. The applications that use notifications may include merchant services, shipping services, payment services, and so forth. For example, the merchant service may send a notification to a user device of a merchant user that indicates that a particular item is out of stock.

The notifications may be routed through a notification distribution server or service to the user device. The notification distribution server may send the notification to the user device. The user device may not be connected to a network. As a result, the notification may not be received by the user device. For example, the notification may indicate that a particular item is out of stock and a reorder of the particular item is necessary. In this example, the user device by not being connected to a network may not receive the notification. By not receiving the notification a reorder for that particular item may not be placed and thus that particular item will remain out of stock. By not reordering the particular item, a user associated with the user device may not be able to receive additional orders for that particular item, may lose customers, and so forth. In addition, the notification distribution server by sending notifications when the user device is not connected to a network may lead to increased bandwidth consumption, increased power consumption, and so forth.

This disclosure describes systems and methods for notification management. The system may include a user device, a merchant server and a notification management server. The user device may be configured to send preference data to the notification management server. The preference data may include information about how a user prefers to have a notification distributed. For example, the preference data may indicate that notifications that are confidential should be sent to a user device associated with a business account. In another example, the preference data may indicate that notifications that are of general information may be sent to any user device. In this example, the notification may be sent to a mobile device, a tablet device, a voice activated device, a television, and so forth.

The user device may send heartbeat data to the notification management server. The heartbeat data may indicate that the user device is connected to a network. The heartbeat data may also include identification information that associates the user device to a merchant account that includes the preference data. The notification management server in response to receiving the heartbeat data may send the notification to the user device. By using heartbeat data, the notifications sent by the notification management server are received by the user device. In addition, using the heartbeat data improves user experience as the user is able to respond to the received notification in a timely manner. For example, the notification may indicate that a particular item is out of stock. By using the heartbeat data, the notification management server only sends the notification when it knows that the user device is connected to a network. The user device thus receives the notification indicating that the particular item is out of stock and is able to restock that particular item. By restocking the particular item user experience is improved as this may lead to additional sales.

The merchant server may send merchant data to the notification management server. The merchant data may indicate that a notification associated with an application should be sent to the user device. The merchant data may indicate order information about a merchant account. For example, that a particular item is out of stock, a fraud alert, receipt of a large order, payment information, purchase information, shipping information, and so forth. The notification management server may send the notification to the user device. For example, the notification management server may send a notification that indicates that the particular item is out of stock. The notification may also enable the user device to perform one or more inputs. Continuing the above example, the user device may provide a user input that sends reorder data to the merchant server to reorder the particular item.

Upon receipt of the merchant data the notification management server may access the preference data. The notification management server may generate a notification based on the merchant data. For example, the notification management server may generate a notification that indicates that a particular item associated with a merchant account is out of stock. The notification management server may send the notification to the user device associated with the merchant account. The user device upon receipt of the notification may send confirmation data to the notification management server and the merchant server. For example, the user device receives the notification that indicates that the particular item is out of stock. The notification may cause a user to either accept or deny reordering the particular item. The user device upon receipt of the user input may send the confirmation data to the notification management server and the merchant server.

By using the techniques and systems described above, for example having the user device send preference data and heartbeat data, the user experience is improved. The user experience is improved as the notification is sent when the user device is connected to a network ensuring at least receipt of the notification. By using confirmation data, as described above, the user experience is improved as when confirmation data that indicates a presentation receipt is not received, the notification management server stores the notification. By storing the notification, the notification management server is able to resend the notification at a later time. In addition, sending the notification when the user device is connected to the network reduces overall network bandwidth consumption. The overall network bandwidth consumption is reduced as the server is sending a notification to user devices that are connected to a network and omitting sending notification to user devices that are not connected to a network.

Illustrative System

FIG. 1 depicts a schematic of a system 100 for notification management. The system 100 may include a user device(s) 102 that includes a touchscreen, mouse, or other input device as well as a display device to present a user interface. The user device 102 may be a television, tablet computer, personal computer, electronic book reader, gaming console, set-top box, media player, in-vehicle entertainment system, smartphone, server, device control system, voice activated device, and so forth. The user device 102 may utilize automated speech recognition or other techniques to receive and analyze audible user inputs.

The user device 102 may send heartbeat data 104 to a notification management server(s) 106. The heartbeat data 104 may indicate that the user device 102 is connected to a network. For example, the user device 102 may not have been connected to a wireless telecommunication technology or may have been turned off. When the user device 102 connects to the wireless telecommunication technology, the user device 102 may send the heartbeat data 104 to the notification management server 106. The wireless telecommunication technology may include a wireless cellular data network (WCDN), fourth generation of wireless mobile telecommunications technology (4G), third generation of wireless mobile telecommunications technology (3G), Wi-Fi, and so forth. In another implementation, the heartbeat data 104 may indicate identification information that associates the user device 102 to a merchant account. For example, the identification information may indicate that the user device 102 is associated with merchant account "Burning Sage," which sells cowboy apparel.

In other implementations, the user device 102 may send preference data to the notification management server 106. The preference data may designate preferred distribution of notifications associated with the merchant account. The preferred distribution may indicate a preferred user device to send the notification to. For example, the notification may indicate that a particular item, such as a brown cowboy hat is out of stock. The preferred distribution may indicate that the notification is to be sent to a business designated user device.

In another implementation, the preferred distribution may indicate a preferred period of time to send the notification. For example, the notification may include business information. The preferred period of time to send business related notifications may be between 9:00 am to 5:00 pm. In another example, the preferred period of time may indicate time periods not to send the notifications, such as between 10:00 pm to 7:00 am. In yet another example, the preferred period of time may indicate to send notifications between 11:00 am to 12:00 pm.

In other implementations, the preferred distribution may indicate a security protocol when sending the notifications. For example, the notification may be business related, restricted, or of sensitive material. The preferred distribution may indicate that such notifications should be passcode protected. In this example, for a user to view the notifications they will be prompted to enter a passcode. The passcode may be a verbal command, voice recognition, decryption key stored on the user device 102, a user input of alphanumeric input, retina scan, fingerprint scan, and so forth.

In yet another implementation, the preferred distribution may indicate a priority hierarchy for sending the notification. For example, the notification management server 106 may have a plurality of notifications to send to the user device 102. The plurality of notifications may correspond to a business notification, a public safety alert, and a social media notification. The priority hierarchy may indicate that public safety alert notifications are sent first, business related notifications are sent second, and any remaining notifications are sent third. In this example, the public safety alert notification would be sent first, then the business notification, and then the social media notification.

The system 100 for notification management may include a merchant server 108. The merchant server 108 may send merchant data 110 to the notification management server 106. The merchant data 110 may be indicative of activity information associated with the merchant account. The activity information may indicate multiple notifications, such as a first notification and a second notification. For example, the activity information may indicate that a particular item is out of stock, a fraud alert or fraud information, order information such as receipt of a large order, payment information, purchase information, shipping information, and so forth. In one implementation, the merchant server 108 may provide merchant services, shipping services, payment services, video services, music services, and so forth. In other implementations, the system 100 may include a merchant server 108 for each of the services described above.

In one implementation, the user device 102, the notification management server 106, the merchant server 108, and so forth, may be located at locations that are physically separate from one another. Each of these devices may be connected to different networks and may communicate with each other using these different networks. For example, the user device 102 may communicate with the notification management server 106 via a Wi-Fi network that is connected to a wired ethernet network. The notification management server 106 may communicate with the merchant server 108 via a wired ethernet network.

The notification management server 106, upon receipt of the merchant data 110 may access a user account module 112. The user account module 112 may include the preference data, as described above. For example, the merchant data 110 may indicate activity information that is business related, such as a particular item is out of stock. The user account module 112 may access the preference data and determine that business related notifications may be sent to particular user devices 102 associated with a business, may be passcode protected, preferred period of time to receive business related notifications, preferred channels, and so forth. The user account module 112 may generate user information 114. The user information 114 may indicate the preferred distribution of notifications. For example, the user information 114 may indicate, as described above, a preferred user device 102 to send the notification to, a preferred period of time to send the notification, a security protocol when sending the notification, a priority hierarchy for sending the notification, and so forth. The user account module 112 may send the user information 114 to the notification module 116.

In another implementation, the user information 114 may indicate preferred channels to send the notification. For example, the merchant data 110 may indicate that a first notification and a second notification are associated with a particular merchant account. The first notification may be a video notification and the second notification may be a business-related notification. The preference data may indicate that for video notifications the first notification should be sent via a first channel and that for business-related notifications the second notification should be sent via a secured channel.

The secured channel may utilize the same or different protocols or portions of protocols as the first channel. For example, the first channel and the secured channel may utilize the same physical layer and data link layer protocols, but the data at the application layer may be unencrypted in the case of the first channel and encrypted in the case of the secure channel. The secure channel may utilize cryptographic techniques at different levels to encrypt the data and protect it from being readable by an unwanted third party. For example, the secured channel may utilize a presentation layer encryption protocol such as transport layer security (TLS), Secure Sockets Layer (SSL), and so forth. The TLS uses encryption to provide security and data integrity for communications over networks. In other implementations, other techniques may be used to provide the secured channel. For example, a stream cipher, block cipher, and so forth may be used to provide the secured channel by encrypting data during transmission.

The notification management server 106, based on the preference data, may establish a secure connection by sending an identification in the form of a digital certificate to the user device 102. The certificate may contain such information as the server name, a trusted certificate authority (CA), the server's public encryption key, and so forth. The user device 102 upon receipt of the information may connect to the notification management server 106 securely. Continuing the above example, the user information 114 may indicate that the first notification be sent via broadband and the second notification should be sent via a secured 4G connection. In one implementation, the broadband channel may be an Internet signal of high bandwidth or capacity. The broadband internet signal may be cable, satellite, digital subscriber line (DSL), fiber-optic or wireless. The 4G channel may be a mobile network. The mobile network may be distributed over land areas called cells, each served by at least one fixed-location transceiver. The fixed-location transceiver may provide the cell with a network coverage that can be used for transmission of data. A cell typically uses a different set of frequencies from neighboring cells, to avoid interference and provide guaranteed service quality within each cell. When the cells are joined together they may provide radio coverage over a wide geographic area. This may enable a large number of user devices 102, as described above, to communicate with each other and with fixed transceivers within the network, via base stations, even if some of the user devices 102 are moving through more than one cell during transmission.

In one implementation, the notification module 116 may include a datastore 118. The datastore 118 may be configured to store the notifications 120(1), 120(2), . . . , 120(D). For example, the notification module 116 after generating the notifications 120(1), 120(2), . . . , 120(D) may store them in the datastore 118. In another example, the notification module 116 may store the notifications 120(1), 120(2), . . . , 120(D) in the datastore 118 after they have been sent to the user device 102.

In other implementations, the notification module 116 may be configured to generate notifications 120(1), 120(2), . . . , 120(D). As used in this disclosure, letters in parenthesis such as "(D)" indicate an integer value. The notification module 116 may generate the notifications 120(1), 120(2), . . . , 120(D) based on the user information 114 and the merchant data 110. For example, the merchant data 110 may indicate that the notification 120(1) may be business related, restricted, or of sensitive material. The user information 114 may indicate that such notifications may be passcode protected. The notification module 116 may generate the notification 120(1) so that when a user views the notifications 120 they will be prompted to enter a passcode. The passcode may be a verbal command, voice recognition, decryption key stored on the user device 102, a user input of alphanumeric input, retina scan, fingerprint scan, and so forth. In another example, the merchant data 110 may indicate that the notification 120(1) may be general information, such as a friend confirming an invitation. The user information 114 may indicate that such notifications may be sent to one or more of the user devices 102 associated with the merchant account. In this example, the notification module 116 may generate the notification 120(1) to indicate that the friend is confirming the invitation.

The notification module 116 may generate notification information 122. The notification information 122 may be the activity information that was included in the merchant data 110. In other implementations, the notification information 122 may indicate the type of information included in the notifications 120(1), 120(2), . . . , 120(D). For example, the notification information 122 may indicate that the notifications 120(1), 120(2), . . . , 120(D) may indicate that a particular item is out of stock, a fraud alert, receipt of a large order, payment information, purchase information, shipping information, and so forth. The notification module 116 may send the notification information 122 to a prioritization module 124.

The prioritization module 124 may determine a prioritized order to send the notifications 120(1), 120(2), . . . , 120(D). For example, the notification information 122 may indicate that the notification 120(1) corresponds to business related information, that the notification 120(2) corresponds to social media information and the notification 120(3) corresponds to a public safety alert. In this example, the notification information 122 may include the user information 114. The user information 114 may indicate that notifications that correspond to public safety are sent first, the business-related notifications and then general notifications, such as social media. In this example, the prioritization module 124 may determine that the notification 120(3) is sent first, then the notification 120(1) and then the notification 120(2). The prioritization module 124 may generate prioritized notification information 126. The prioritized notification information 126 may indicate the determined prioritized order, as described above. The prioritization module 124 may send the prioritized notification information 126 to a communication module 128.

The communication module 128 may be configured to send the notifications 120(1), 120(2), . . . , 120(D) to the user device 102. The communication module 128 may send the notifications 120(1), 120(2), . . . , 120(D) based on the prioritized notification information 126. For example, the communication module 128 may have in a queue the notification 120(1) that corresponds to business related information, the notification 120(2) that corresponds to social media information and the notification 120(3) that corresponds to a public safety alert. In this example, the prioritized notification information 126 may indicate that the notification 120(3) is to be sent first, then the notification 120(1) and then the notification 120(2).

In other implementations, the communication module 128 may aggregate the notifications 120(1), 120(2), . . . , 120(D). For example, the communication module 128 may have in a queue the notification 120(1) that corresponds to business related information, the notification 120(2) that corresponds to social media information and the notification 120(3) that corresponds to a public safety alert. In this example, the communication module 128 may aggregate the notifications 120(1), 120(2), and 120(3) and send them as one (1) notification to the user device 102.

In another implementation, the system 100 may include a notification management server 106 for each of the merchant servers 108. For example, the system 100 may include a merchant server 108 for a video service, a payment service, a social media service, and so forth. The system 100 may have a notification management server 106 designated for each of these services. In this example, the notification management server 106 may receive the heartbeat data 104, the merchant data 110, generate the notifications 120(1), 120(2), . . . , 120(D), and send the notifications 120(1), 120(2), . . . , 120(D) to the user device 102, as described above.

The user device 102, upon receipt of the notifications 120(1), 120(2), . . . , 120(D) may send confirmation data 130 to the notification management server 106. For example, the user device 102 may send the confirmation data 130 to the notification management server 106 upon receipt of the notification 120(1). In this example, the confirmation data 130 indicates that the user device 102 at least received the notification 120(1). The notification management server 106 may remove the notification 120(1) from the datastore 118.

In other implementations, the notification management server 106 may remove the notification 120(1) from the datastore 118 after a period of time has elapsed. For example, the notification management server 106 may remove the notification 120(1) from the datastore 118 after twenty-four (24) hours have elapsed.

In another implementation, the notification management server 106 may store the notifications 120(1), 120(2), . . . , 120(D) until the capacity of the datastore 118 becomes full. The notification management server 106 may remove the notifications 120(1), 120(2), . . . , 120(D) in a first-in-first-out (FIFO) process. For example, the notification 120(1) may have been the first notification stored, the notification 120(3) may have been the second notification stored, and the notification 120(2) may have been the third notification stored. In this example, the notification management server 106 may remove the notification 120(1) first, then the notification 120(3), and then the notification 120(2).

The user device 102 may send the confirmation data 130 to the notification management server 106 upon the presentation of the notification 120(1) by the user device 102. For example, the notification 120(1) may be a friend's confirmation to a party. The user device 102 may receive a user input to present the notification 120(1). The user device 102 upon presenting the notification 120(1) either verbally as a verbal command provided by the user device 102, via a speaker, visually as presented on a display device associated with the user device 102, or a combination thereof, may send the confirmation data 130 to the notification management server 106.

In other implementations, the user device 102 may send the confirmation data 130 to the merchant server 108. For example, the notification 120(1) may indicate that a particular item is out of stock, a fraud alert, receipt of a large order, payment information, purchase information, shipping information, and so forth. The notification 120(1) may cause a user of the user device 102 to perform one or more user inputs. Continuing the above example, the user device 102 may receive a user input to reorder the particular item that is out of stock. The user device 102 may send the confirmation data 130 that includes the user input to reorder the particular item to the merchant server 108. The merchant server 108 upon receipt of the confirmation data 130 may reorder that particular item. In another example, the notification 120(1) may indicate fraud information. The fraud information may indicate malicious activity associated with the merchant account. For example, the fraud information may indicate suspicious activity with a line of credit or bank account associated with the merchant account. The notification 120(1) may request a user of the user device 102 to perform one or more user inputs. The one or more user inputs may place a hold on the line of credit or bank account. The one or more user inputs may also indicate to have a bank representative contact the user of the user device 102. The user device 102 may send the confirmation data 130 that includes the one or more user inputs to the merchant server 108.

In another implementation, the user device 102 may send the confirmation data 130 to the notification management server 106 and the merchant server 108. The notification management server 106 may store the notifications 120(1), 120(2), . . . , 120(D) when the confirmation data 130 is not received within a period of time. The period of time may be a few minutes, such as five (5) minutes, hours, such as two (2) hours, days, and so forth. For example, the notification management server 106 may store the notifications 120(1), 120(2), . . . , 120(D) when the confirmation data 130 is not received within two (2) minutes from sending the notification 120(1) to the user device 102. In this example, the notification management server 106 stores the notification 120(1) until it receives the confirmation data 130 or receives the heartbeat data 104. When the notification management server 106 receives the confirmation data 130 the notification 120(1) may be removed from the datastore 118. When the notification management server 106 receives the heartbeat data 104, the notification management server 106 may send the notification 120(1), as described above.

Figure 2:
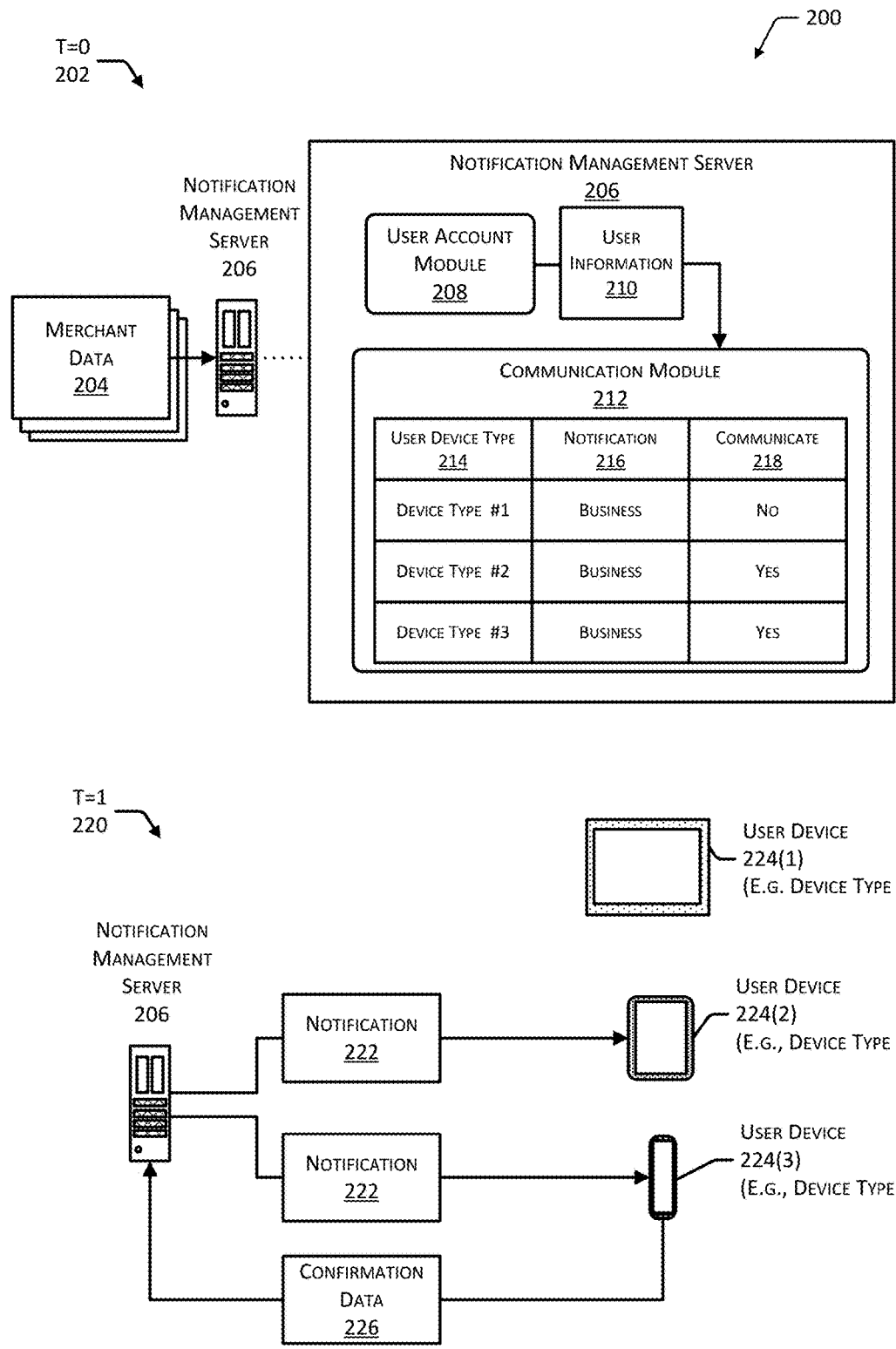
FIGS. 2 and 3 are an example of notification management.

FIG. 2 is an example 200 off notification management. The example 200, at 202 (T=0), includes merchant data 204 being received by the notification management server 206. The merchant data 204 may be the merchant data 110. The merchant data 204 may be indicative of activity information associated with the merchant account. For example, the activity information may indicate that a particular item is out of stock, fraud information, receipt of a large order, payment information, purchase information, shipping information, and so forth.

The notification management server 206 may be the notification management server 106. The notification management server 206 may include a user account module 208. The user account module 208 may be the user account module 112. The user account module 208 may include the preference data, as described above. For example, the merchant data 204 may indicate activity information that is business related, such as a particular item is out of stock. The user account module 208 may access the preference data and determine that business related notifications may be sent to particular user devices associated with a business, may be passcode protected, preferred period of time to receive business related notifications, and so forth. The user account module 208 may generate user information 210. The user information 210 may be the user information 114. The user information 210 may indicate the preferred distribution of notifications. For example, the user information 210 may indicate, as described above, a preferred user device to send the notification to, a preferred period of time to send the notification, a security protocol when sending the notifications, a priority hierarchy for sending the notification, and so forth. The user account module 208 may send the user information 210 to the communication module 212.

The communication module 212 may be the communication module 128. The communication module 212 may access the user information 210 which indicates user device type 214, notification 216, and communicate 218. The user device type 214 may indicate the user devices associated with a merchant account. The notification 216 may indicate the notification type. For example, the notification 216 may indicate business related notifications, social media related notifications, public safety alert information, general information, and so forth. The communicate 218 may indicate whether to send a notification to a particular user device. For example, the user information 210 may indicate that for business related notifications that the communication module 212 may send notifications to device type #2 and #3 and omit sending business related notifications to device type #1.

At (T=1) 220, the notification management server 206 may generate a notification 222, as described above. The notification management server 206 may send the notification 222 to one or more user devices 224(1), 224(2), 224(3), . . . 224(D). For example, the notification 222 may be business related as described above. The user information 210 may indicate to send the notifications 222 to the user devices 224(2) and 224(3). The user information 210 may also indicate to omit sending the notifications 222 to the user device 224(1). The user device 224(3) may send confirmation data 226 to the notification management server 206. The confirmation data 226 may be the confirmation data 130, as described above. In one implementation, the confirmation data 226 may indicate that the user device 224(3) at least received the notification 222, as described above. In other implementations, the confirmation data 226 may indicate that the user device 224(3) presented the notification 222, as described above. For example, the notification 222 may indicate that a particular item associated with the merchant account is out of stock. The user device 224(3) may receive a user input to present the notification 222. The user device 224(3) upon presenting the notification 222, as described above, may send the confirmation data 226 to the notification management server 206. In another implementation, the user device 224(2) may send the confirmation data 226 to the notification management server 206.

Figure 3:
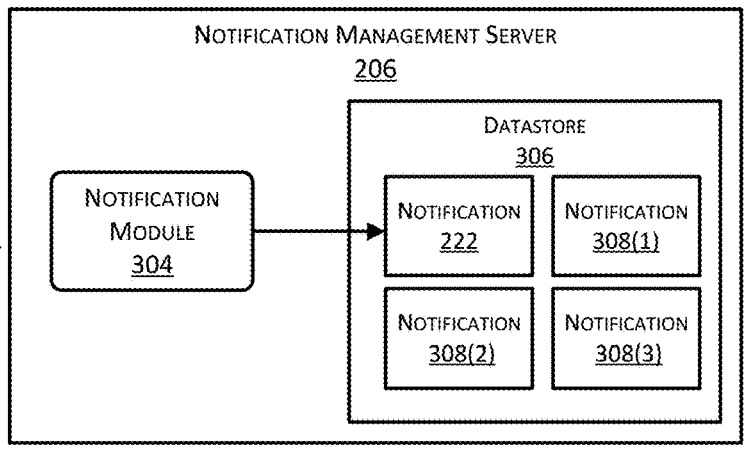
Figure 3:
Figure 3:
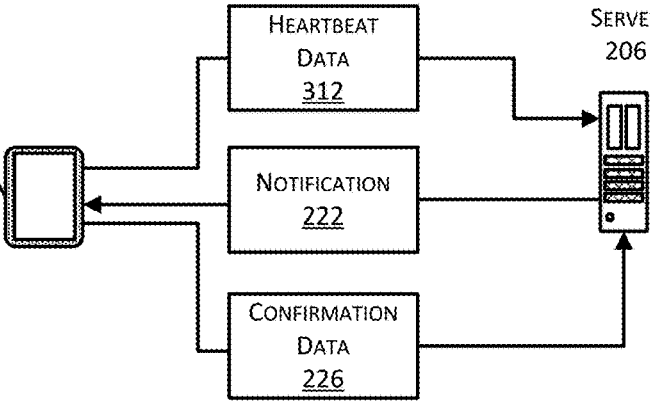

FIG. 3 depicts the continuation of the example 200 from FIG. 2 for notification management. In one implementation, the notification management server 206 may not have received the confirmation data 226 from the user device 224(2) or the user device 224(3). At 302 (T=2) a notification module 304 may store the notification 222 in datastore 306. The notification module 304 may be the notification module 116. The datastore 306 may be the datastore 118. The datastore 306 may be configured to store the notification 222 and notifications 308(1), 308(2), . . . , 308(D). For example, the notification module 304 may store the notification 222 when the confirmation data 226 is not received, as described above. The notification module 304 may also generate and store the notifications 308(1), 308(2), . . . , 308(D) in the datastore 306, as described above.

At (T=3) 310, the user device 224(2) may send heartbeat data 312 to the notification management server 206. The heartbeat data 312 may be the heartbeat data 104. The heartbeat data 312 may indicate that the user device 224(2) is connected to a network, as described above. The heartbeat data 312 may also indicate identification information that associates the user device 224(2) to the merchant account. In some implementations, a user may allow the user device 224(1), 224(2), 224(3), . . . , 224(N) to provide heartbeat data 312 that includes location information. The location information may describe latitude, longitude, altitude, street address, zip code, state, county, building, floor, and so forth, of the user devices 224(1), 224(2), 224(3), . . . , 224(N) or of another device that is nearby. As described in more detail with regard to FIG. 4, the notification management server 206 may use the location information to determine which of the other user devices 224 are to be used as an access point to send the notification 222 when the user devices 224(1), 224(2), 224(3), . . . , 224(N) do not have network connectivity.

The notification management server 206 upon receipt of the heartbeat data 312 may send the notification 222 to the user device 224(2). The heartbeat data 312 may indicate that the user device 224(2) is connected to a network. For example, the user device 224(2) may not have been connected to a network at the time the notification management server 206 sent the notification at (T=1) 220. When the user device 224(2) connects to a network, the user device 224(2) may send the heartbeat data 312 to the notification management server 206. In other implementations, the heartbeat data 312 may indicate identification information that associates the user device 224(2) to the merchant account.

The notification management server 206 upon receipt of the heartbeat data 312 may send the notification 222 to the user device 224(2). The user device 224(2) upon receipt or presentation of the notification 222 may send the confirmation data 226 to the notification management server 206, as described above.

Figure 4:
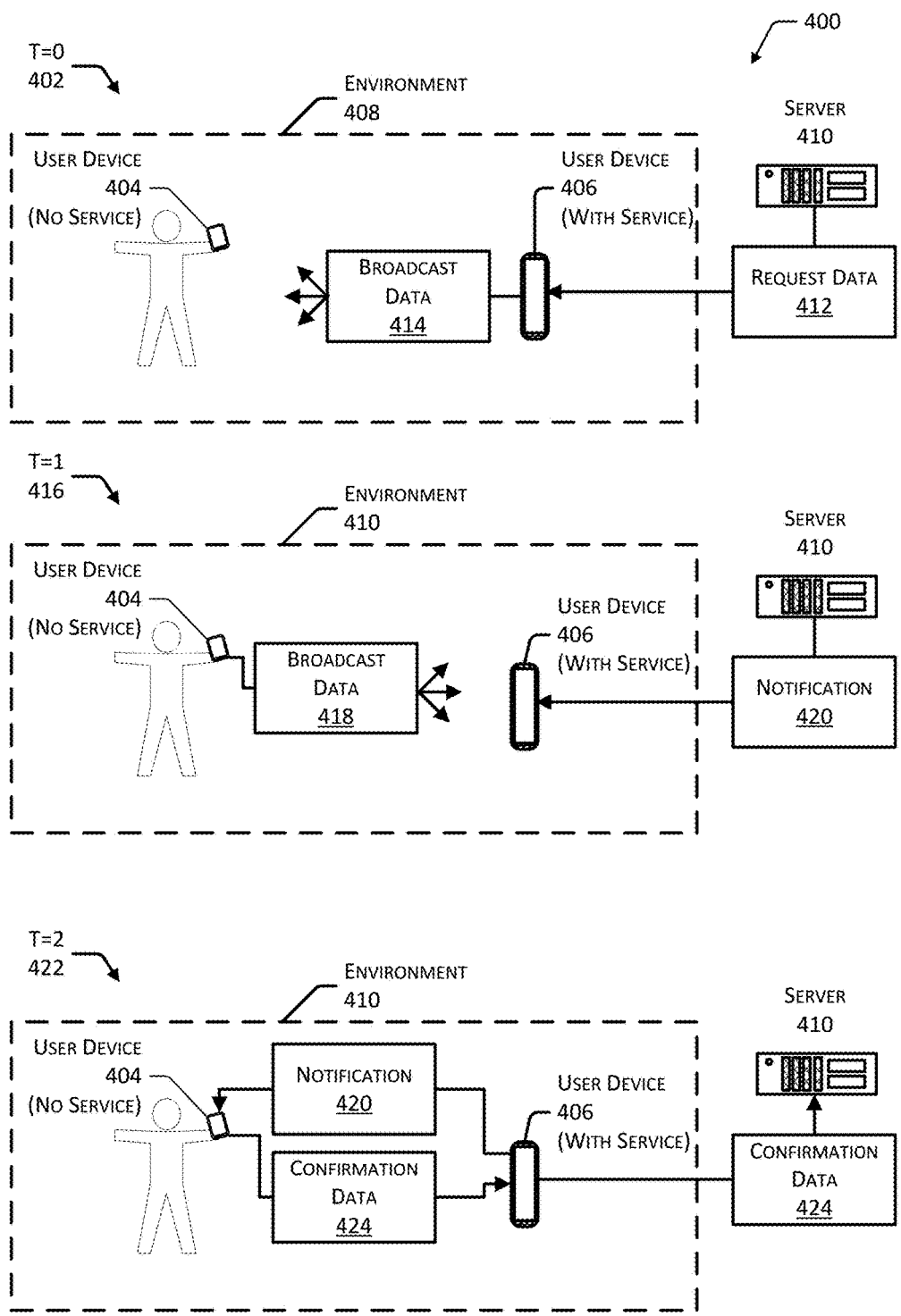
FIG. 4 is an example of an environment for locating a user device and notification management.

FIG. 4 is an example 400 of an environment for locating a user device and notification management. At (T=0) 402, user devices 404 and 406 may be within an environment 408. The user device 404 may not be connected to a network and may not have network connectivity. The user device 406 may be connected to a network and have service. The environment 408 may be a public area or private area. For example, the environment 408 may be a park, shopping center, a home, a neighbor's home, airport, doctor's office, and so forth.

A server 410 may receive merchant data 110 from a merchant server 108. The server 410 may be the notification management server 106, 206. The merchant data 110 may be indicative of activity information associated with the merchant account, as described above. For example, the activity information may indicate a fraud alert or fraud information. The server 410 may determine that the fraud alert notification is of high priority based on the preference data, as described above. The server 410 may determine that the user device 404 is not connected to a network based on not receiving heartbeat data 104. The server 410 may determine that the user device 404 is located within the environment 408 based on last received heartbeat data 104 or log in information. The last received heartbeat data 104 may include location information. The location information may describe latitude, longitude, altitude, street address, zip code, state, county, building, floor, and so forth, of the user device 404 or other user devices proximate to the user device 404. For example, the user device 404 may have sent heartbeat data 104 to the server 410 which indicated that the user device 404 was proximate to the environment 408. The heartbeat data 104 may include location information that may be processed to determine that the user device 406 is proximate to the user device 404. For example, heartbeat data 104 provided by the user device 404 may indicate that the user device 404 was last located proximate to a neighbor's home. Continuing the example, the heartbeat data 104 provided by the user device 406 may also indicate that the user device 406 was last located at the neighbor's home. By comparing the location information for the user device 404 and the user device 406 and determining that they are within a threshold distance of one another, the server 410 may determine that the user device 406 is proximate to the user device 404. The server 410 may send request data 412 to the user device 406. The request data 412 may cause the user device 406 to send broadcast data 414. The broadcast data 414 may indicate a request to send notifications 120 and 222. The broadcast data 414 may also indicate a request for the user device 406 to connect to the user device 404. The connection between the user devices 404 and 406 may enable the server 410 to send notifications 120 and 222 to the user device 404 via the user device 406. In other implementations, the broadcast data 414 may include the notifications 120 and 222.

At (T=1) 416, the user device 404 may send broadcast data 418. The broadcast data 418 may indicate a confirmation of receipt of the broadcast data 414. For example, the user device 404 may detect the broadcast data 414. The user device 404 upon detection may send the broadcast data 418 that indicates a notification 420 may be sent. In other implementations, the broadcast data 418 may also indicate a confirmation to have the user devices 404 and 406 connect to each other. The connection between the user devices 404 and 406 may be a peer-to-peer connection. The server 410 may send the notification 420 to the user device 406. The notification 420 may be based on the user information 114 and the merchant data 110, as described above. For example, the merchant data 110 may indicate a fraud alert. The server 410 may generate the notification 420 to indicate that one or more bank accounts or credit accounts associated with the merchant account has been compromised.

In other implementations, the connection between the user devices 404 and 406 may be a short-range inter-device communication. The short-range inter-device communication may include, but is not limited to, induction wireless or infrared wireless such as technologies operating according to specifications and protocols provided by the Infrared Data Association (IrDA) or ultra-wideband formats. In another implementation, the connection between the user devices 404 and 406 may utilize short-range, low-power, and high-frequency radio transmissions, such as Bluetooth. In still other implementations, the connection between the user devices 404 and 406 may support acoustic-based data transfer. For example, the user device 404 and 406 may include software components and a speaker that enable the user devices 404 and 406 to broadcast data 414 and 418 to each other as sound waves. The user devices 404 and 406 may include software components and a microphone that enable the user devices 404 and 406 to receive the broadcast data 414 and 418 embedded in the sound waves. Thus, one or more of radio signal-based data transfer (e.g., NFC or Bluetooth), light-based data transfer (e.g., infrared data transfer), acoustic-based data transfer (e.g., sound wave-embedded data), or magnetic field-based transfer may be used for inter-device communication. The protocols and components for enabling computing devices to perform the systems and methods of the present disclosure using such means for inter-device communication are well known to those skilled in the art of computer communications and thus, need not be described in more detail herein.

At (T=2) 422, the user device 406 may send the notification 420 to the user device 404, as described above. The user device 404 upon receipt may send confirmation data 424 to the user device 406. The user device 406 may send the confirmation data 424 to the server 410. For example, the user device 404 may send the confirmation data 424 to the server 410 upon receipt of the notification 420. In this example, the confirmation data 424 indicates that the user device 404 at least received the notification 420.

In another implementation, the user device 404 may send the confirmation data 424 upon the presentation of the notification 420 by the user device 404. For example, the notification 420 may indicate that one or more bank accounts associated with the merchant account has been compromised. The user device 404 may receive a user input to stop all actions associated with the compromised bank accounts. The user device 404 upon receiving the user input, may send the confirmation data 420 to the server 410, via the user device 406.

In other implementations, at (T=0) 402, the user may be accessing a service, via the user device 404, within the environment 408. For example, the user may be at an airport accessing a website, via the user device 404, to purchase an item. The website may prompt the user to provide log-in credentials, such as a user name and password. By providing the log-in credentials, the server 410 may determine the location of the user device 404, user devices that are proximate to the user device 404, and proximate access points. The server 410 may send the request data 412 to the user device 406. The request data 412, as described above, may cause the user device 406 to send the broadcast data 414 to the user device 404. The broadcast data 414 may be encrypted by a system, the server 410 or the user device 406. For example, the broadcast data 414 may be generated in a secure manner and to be cryptographically verifiable. For example, the broadcast data 414 or a portion thereof may be encrypted so as to be decryptable by a system to which the broadcast data 414 is presented. For example, the broadcast data 414 or a portion thereof may be encrypted using a public key of a public/private key pair where the private key of the public/private key pair is securely maintained by a system that analyzes the broadcast data 414 for verification. The broadcast data 414 may be encrypted by the public key itself or in other ways utilizing the public key. In another example, a symmetric cryptographic key may be generated and used to encrypt the broadcast data 414 and the public key may be used to encrypt the cryptographic symmetric key. The encrypted symmetric cryptographic key may be provided as part of the broadcast data 414 so that a system, such as the user device 404, that processes the broadcast data 414 for the purpose of using and presenting the broadcast data 414 may use its copy of the private key corresponding to the public key to decrypt the symmetric key and then use the symmetric key to decrypt the broadcast data 414. Other variations are also considered as being within the scope of the present disclosure, including encryption of the broadcast data 414 using a symmetric cryptographic key maintained as a secret shared between the system that encrypted the broadcast data 414 and a system to which the broadcast data 414 is presented for verification. Further, various implementations may utilize different layers of encryption, and the verification of the broadcast data 414 may be performed by a distributed system having multiple components, each of which is able to access some, but not necessarily all, information in the broadcast data 414 through decryption.

In other implementations, the server 410 may encrypt the broadcast data 414 by using a public key associated with the user device 404. The server 410 may encrypt the broadcast data 414 to obfuscate the broadcast data 414, preventing the user device 406 from determining the content of the notification. To help improve this, the encryption scheme may use some form of rolling codes or one-time password (OTP) that may change on a periodic basis (or per-data-packet basis).

In other implementations, the server 410 may encrypt the broadcast data 414 by using envelope encryption. For example, the server 410 may establish a trusted relationship with the user device 406. The server 410 may establish the trusted relationship by using localized device encryption. By using the localized device encryption the user device 406 may not be able to communicate with the server 410 without having the necessary credentials and encryption keys. The user device 406 may act as a proxy for the server 410 and utilize an established protocol to connect with the user device 404 as a proxy. For example, the user device 406 may use secondary keys associated with the server 410 to establish a secure connection with the user device 404. When the user device 406 cannot use secondary keys to establish the secure connection with the server 410 and the user device 404 then the notification 420 cannot be sent. In another example, when the secured connection is not established a modified version of the notification 420 may be sent that does not include confidential information. For example, instead of indicating that fraud has be detected on your merchant account, the notification 420 may indicate that a service is attempting to contact you, and request the user to please connect to a network as soon as possible as the notification 420 is important to your merchant account.

In another implementation, the user device 406 may take the encrypted request data 412 or broadcast data 414 from the server 410 and encrypt the encrypted data with its own keys. In this implementation, the user device 404 would need to decrypt two layers of encryption to access the notification 420.

The user device 404 upon receiving the broadcast data 414 may decrypt the broadcast data 414 by using a private key stored on the user device 404 to determine that the user device 406 is trusted. For example, the user device 404 may decrypt the broadcast data 414 using the private key when the user device 404 accesses the broadcast data 414 to connect to the user device 406. In other implementations, the broadcast data 414 may be encrypted by the server 410 using a symmetric-key scheme. In this implementation, the encryption and decryption keys are the same. The user device 404 may have the decryption key already stored on the user device 404. In other implementations, the sending and receiving of the broadcast data 414 between the various user devices and servers may be encrypted or otherwise secured. For example, such encryption may employ one or more public or private cryptographic keys, ciphers, digital certificates, or other credentials supported by a security protocol such as any version of the Secure Sockets Layer (SSL) or the Transport Layer Security (TLS) protocol.

At (T=1) 416, the user device 404 upon decrypting the broadcast data 414 may connect to the user device 406 via the broadcast data 418. At (T=2) 422, the user device 406 may send the notification 420 to the user device 404, as described above. The user device 404 upon receipt of the notification 420 may send the confirmation data 424 to the user device 406. The user device 406 may forward the confirmation data 424 to the server 410, as described above.

Figure 5:
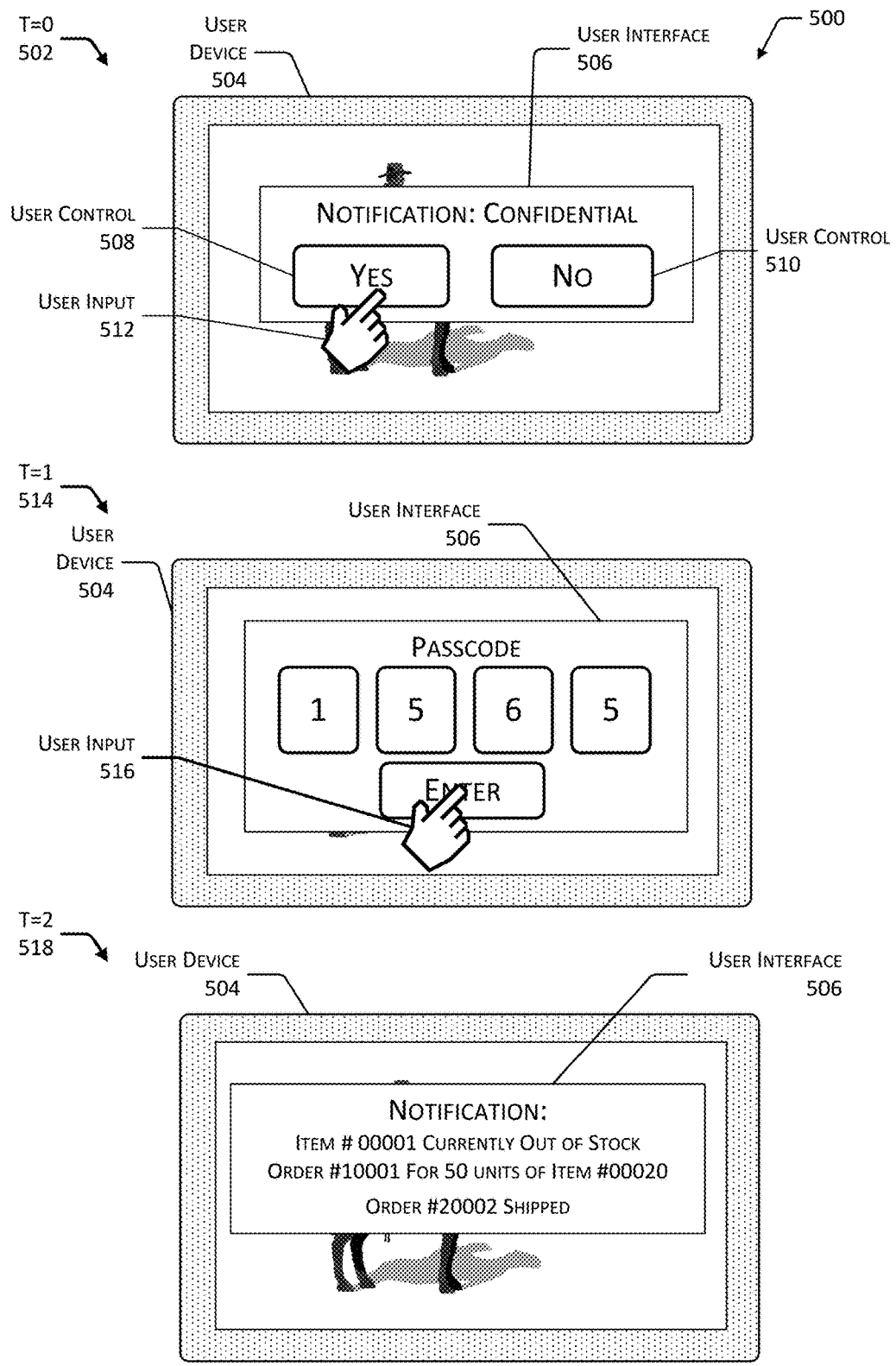
FIG. 5 is an example of a user interface for notification management.

FIG. 5 is an example 500 of a user interface for notification management. At (T=0) 502 a user device 504 may include a user interface 506. The user device 504 may be the user device 102, 224(1), 224(2), 224(3), . . . , 224(D), or 404. The user device 504 may receive the notification 120(1) from the notification management server 106, as described above. The notification 120(1) may cause the user interface 506 to present the notification 120(1). The notification 120(1) may be confidential based on the merchant data 110, as described above. For example, the notification 120(1) may be business related and include such information as that a particular item is out of stock, a large order for a particular item has been received, an order has been shipped, and so forth. The notification 120(1) may cause the user interface 506 to present user controls 508 and 510. The user controls 508 and 510 may enable a user to select a "yes" user control 508 or a "no" user control 510. The "yes" user control 508 may cause the user device 504 to present the notification 120(1). The "no" user control 510 may cause the user device 504 to omit the presentation of the notification 120(1). The user device 504 may receive user input 512 selecting the "yes" user control 508.

At (T=1) 514, the user interface 506 may prompt a user to enter a passcode to present the notification 120(1). The passcode may be a verbal command, voice recognition, decryption key stored on the user device 504, a user input 516 of alphanumeric input, retina scan, fingerprint scan, and so forth. The user device 504 may receive user input 516 entering the passcode to have the notification 120(1) presented.

At (T=2) 518, the user interface 506 may present the notification 120(1) to the user. For example, the notification 120(1) may be business related and include such information as item #00001 is currently out of stock, that order #10001 is for fifty (50) units of item #00020, and that order #20002 has shipped. The user interface 506 may present one or more actions that a user may select. For example, the one or more actions may be a user control that enables the user to place an order to reorder item #00001 that is currently out of stock. In another example, the one or more actions may be a user control that enables the user to indicate that order #10001 is of high priority. In yet another example, the one or more actions may be a user control that enables to the user interface 506 to present tracking information associated with the order #20002 that was shipped.

Figure 6:
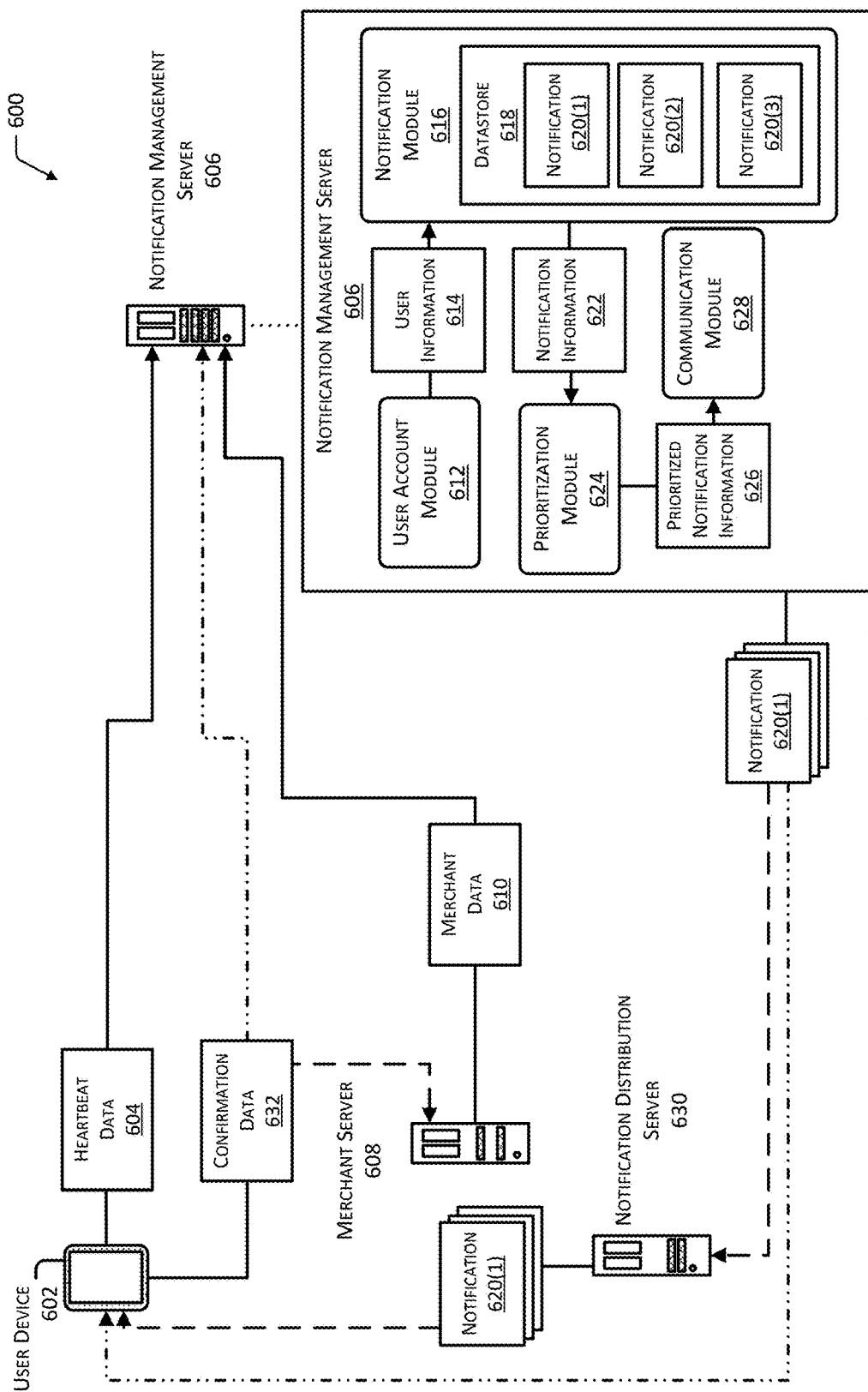
FIG. 6 depicts a schematic of a system for notification management.

FIG. 6 depicts a schematic of a system 600 for notification management. The system 600 may include a user device(s) 602. The user device 602 may be the user device 102, 224(1), 224(2) 224(3), . . . , 224(D), 404, or 504, as described above.

The user device 602 may send heartbeat data 604 to a notification management server(s) 606. The heartbeat data 604 may be the heartbeat data 104, as described above. The heartbeat data 604 may indicate that the user device 602 is connected to a network. For example, the user device 602 may have been turned off. When the user device 602 is turned on and connects to the wireless telecommunication technology, the user device 602 may send the heartbeat data 604 to the notification management server 606. The heartbeat data 604 may also indicate identification information that associates the user device 602 to a merchant account. For example, the identification information may indicate that the user device 602 is associated with merchant account "Burning Sage," which sells cowboy apparel.

In other implementations, the user device 602 may send preference data to the notification management server 606. The preference data may be included in the heartbeat data 604. The preference data, as described above, may designate preferred distribution of notifications 120, 222, or 420 associated with the merchant account. For example, a notification 120, 222, or 420 may indicate that a particular item, such as a brown cowboy hat is out of stock. The preferred distribution may indicate that the notification 120, 222, or 420 is to be sent to a business designated user device.

In another implementation, the preferred distribution may indicate a preferred period of time to send the notification 120, 222, or 420, a security protocol when sending the notifications 120, 222, or 420, a priority hierarchy for sending the notification 120, 222, or 420, and so forth, as described above.

The system 600 for notification management may include a merchant server 608. The merchant server 608 may be the merchant server 108, as described above. The merchant server 608 may send merchant data 610 to the notification management server 606. The merchant data 610 may be indicative of activity information associated with the merchant account. For example, the activity information may indicate that a particular item is out of stock, a fraud alert, receipt of a large order, payment information, purchase information, shipping information, and so forth.

The notification management server 606, upon receipt of the merchant data 610 may access a user account module 612. The user account module 612 may be the user account module 112, as described above. The user account module 612 may include the preference data, as described above. For example, the merchant data 610 may indicate activity information that is business related, such as a particular item is out of stock. The user account module 612 may access the preference data and determine that business related notifications may be sent to particular user devices 602 associated with a business. The user account module 612 may generate user information 614. The user information 614 may indicate the preferred distribution of notifications. For example, the user information 614 may indicate, as described above, a preferred user device 602 to send the notification to, a preferred period of time to send the notification, a security protocol when sending the notifications, a priority hierarchy for sending the notification, and so forth. The user account module 612 may send the user information 614 to the notification module 616.

In one implementation, the notification module 616 may be configured to generate notifications 620(1), 620(2), . . . , 620(D). As used in this disclosure, letters in parenthesis such as "(D)" indicate an integer value. The notification module 616 may generate the notifications 620(1), 620(2), . . . , 620(D) based on the user information 614 and the merchant data 610, as described above. For example, the merchant data 610 may indicate that the notification 620(1) may be business related, restricted, or of sensitive material. The user information 614 may indicate that such notifications may be passcode protected. The notification module 616 may generate the notification 620(1) so that when a user views the notifications 620 they will be prompted to enter a passcode, as described above.

In other implementations, the notification module 616 may include a datastore 618. The datastore 618 may be the datastore 118. The datastore 618 may be configured to store the notifications 620(1), 620(2), . . . , 620(D). For example, the notification module 616 after generating the notifications 620(1), 620(2), . . . , 620(D) may store them in the datastore 618.

The notification module 616 may generate notification information 622. The notification information 622 may be the notification information 122, as described above. The notification information 622 may be the activity information that was included in the merchant data 610. In other implementations, the notification information 622 may indicate the type of information included in the notifications 620(1), 620(2), . . . , 620(D), as described above. The notification module 616 may send the notification information 622 to prioritization module 624.

The prioritization module 624 may be the prioritization module 124, as described above. The prioritization module 624 may determine a prioritized order to send the notifications 620(1), 620(2), . . . , 620(D). For example, the notification information 622 may indicate that the notification 620(1) corresponds to business related information, that the notification 620(2) corresponds to social media information, and the notification 620(3) corresponds to a public safety alert. In this example, the notification information 622 may include the user information 614. The user information 614 may indicate that notifications that correspond to public safety are sent first, the business-related notifications, and then general notifications, such as social media. In this example, the prioritization module 624 may determine that the notification 620(3) is sent first, then the notification 620(1) and then the notification 620(2). The prioritization module 624 may generate prioritized notification information 626. The prioritized notification information 626 may indicate the determined prioritized order, as described above. The prioritization module 624 may send the prioritized notification information 626 to a communication module 628.

The communication module 628 may be the communication module 128, as described above. The communication module 628 may be configured to send the notifications 620(1), 620(2), . . . , 620(D) to the user device 602. The communication module 628 may send the notifications 620(1), 620(2), . . . , 620(D) based on the prioritized notification information 626, as described above.

In other implementations, the communication module 628 may aggregate the notifications 620(1), 620(2), . . . , 620(D). For example, the communication module 628 may have in a queue the notification 620(1) that corresponds to business related information, the notification 620(2) that corresponds to social media information, and the notification 620(3) that corresponds to a public safety alert. In this example, the communication module 628 may aggregate the notifications 620(1), 620(2), and 620(3) and send them as one (1) notification to the user device 602.

In another implementation, the communication module 628 may send the notifications 620(1), 620(2), ..., 620(D) or the aggregate notifications to a notification distribution server 630. The communication module 628 may send distribution information to the notification distribution server 630. The distribution information may indicate the particular user device(s) 620 to send each of the notifications 620(1), 620(2), ..., 620(D) to. The notification distribution server 630 may be associated with a network provider of the user device 602. The notification distribution server 630 may be configured to send the notifications 620(1), 620(2), ..., 620(D) or the aggregate notifications to the user device 602.

The user device 602, upon receipt of the notifications 620(1), 620(2), ..., 620(D) may send confirmation data 632 to the notification management server 606, as described above. For example, the user device 602 may send the confirmation data 632 to the notification management server 606 upon receipt or presentation of the notification 620(1). The confirmation data 632 indicates that the user device 602 at least received or presented the notification 620(1), as described above. The notification management server 606 may remove the notification 620(1) from the datastore 618.

In other implementations, the user device 602 may send the confirmation data 632 to the merchant server 608, as described above. For example, the notification 620(1) may indicate that a particular item is out of stock, a fraud alert, receipt of a large order, payment information, purchase information, shipping information, and so forth. The notification 620(1) may cause a user of the user device 102 to perform one or more user inputs. Continuing the above example, the user device 602 may receive a user input to reorder the particular item that is out of stock. The user device 602 may send the confirmation data 632 that includes the user input to reorder the particular item to the merchant server 608. The merchant server 608 upon receipt of the confirmation data 632 may reorder that particular item.

In another implementation, the user device 602 may send the confirmation data 632 to the notification management server 606 and the merchant server 608, as described above. The notification management server 606 may store the notifications 620(1), 620(2), ..., 620(D) when the confirmation data 632 is not received within a period of time, as described above. For example, the notification management server 606 may store the notifications 620(1), 620(2), ..., 620(D) when the confirmation data 632 is not received within two (2) minutes from sending the notification 620(1) to the user device 602. In this example, the notification management server 606 stores the notification 620(1) until it receives the confirmation data 632 or receives the heartbeat data 604. When the notification management server 606 receives the confirmation data 632 the notification 620(1) may be removed from the datastore 618. When the notification management server 606 receives the heartbeat data 604, the notification management server 606 may send the notification 620(1), as described above.

Figure 7:
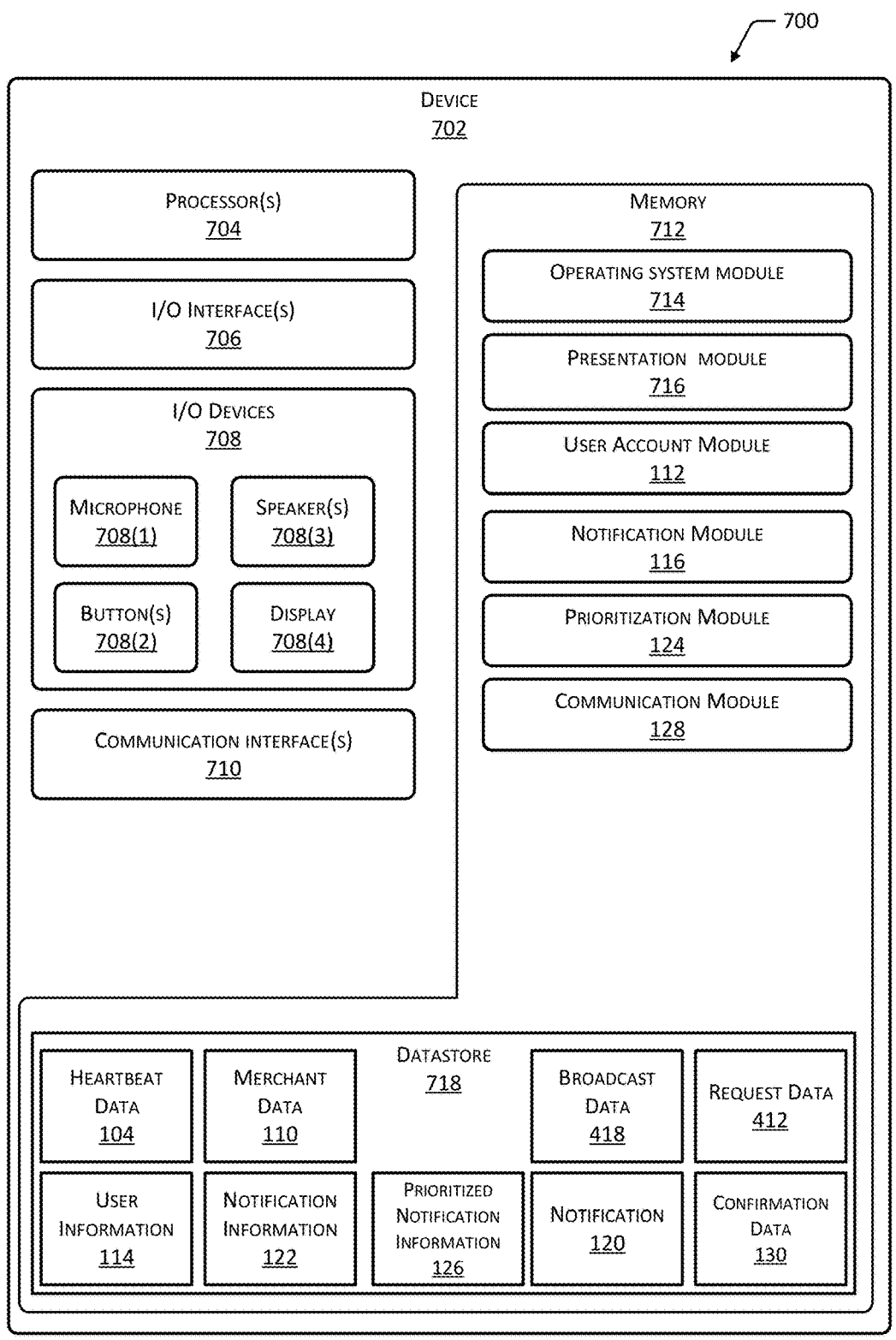
FIG. 7 illustrates a block diagram of a device for notification management.

FIG. 7 illustrates a block diagram 700 of a device 702. The device 702 may be the user device 102, 224(1), 224(2), 224(3), ..., 224(D), 404, 406, 504, 602, the notification management server 106, 206, 606, the merchant server 108, 608, the server 410, or the notification distribution server 630. The device 702 is illustrative and non-limiting, and may be a desktop computer, a tablet computer, a server, a wearable computer, an e-book reader, a media device, a cellular phone, a laptop computer, or another suitable apparatus. The device 702 may include one or more processors 704 configured to execute one or more stored instructions. The processor(s) 704 may comprise one or more cores and may also be referred to as hardware processors.

The device 702 may include one or more input/output (I/O) interface(s) 706 to allow the processor(s) 704 or other components of the device 702 to communicate with various other devices 702, other computing devices, the notification management server 106, 206, 606, the merchant server 108, 608, the server 410, the notification distribution server 630, the user device 102, 224(1), 224(2), 224(3), ..., 224(D), 404, 406, 504, 602, other services, and so on. The I/O interfaces 706 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 706 may couple to one or more I/O devices 708. The I/O devices 708 may include one or more input devices such as a keyboard, a mouse, a microphone 708(1), user input buttons 708(2), and so forth. The I/O devices 708 may also include output devices such as audio speakers 708(3), one or more displays 708(4), and so forth. In some embodiments, the I/O devices 708 may be physically incorporated within the device 702, or they may be externally placed. The I/O devices 708 may include various other devices as well.

The device 702 may also include one or more communication interfaces 710. The communication interface(s) 710 are configured to provide communications with other devices, web-based resources, the notification management server 106, 206, 606, the merchant server 108, 608, the server 410, the notification distribution server 630, the user device 102, 224(1), 224(2), 224(3), ..., 224(D), 404, 406, 504, 602, other services, routers, wireless access points, and so forth. The communication interfaces 710 may include wireless functions, devices configured to couple to one or more networks including local area networks (LANs), wireless LANs, wide area networks (WANs), and so forth. The device 702 may also include one or more busses or other internal communications hardware or software that allow for the transfer of data between the various modules and components of the device 702.

The device 702 includes one or more memories 712. The memory 712 comprises one or more computer-readable storage media (CRSM). The memory 712 provides storage of computer readable instructions, which enables the user device 102, 224(1), 224(2), 224(3), ..., 224(D), 404, 406, 504, 602, to present the user interface 506, the notifications 120(1), 120(2), 120(3), ..., 120(D), 222, 420, data structures, program modules, and other data used during the operation of the user device 102, 224(1), 224(2), 224(3), ..., 224(D), 404, 406, 504, 602, the merchant server 108, 608, the server 410, or the notification distribution server 630. The memory 712 may include at least one operating system (OS) module 714. Respective OS modules 714 are configured to manage hardware devices such as the I/O interface(s) 706, the I/O devices 708, the communication interface(s) 710, and provide various services to applications or modules executing on the processors 704.

Also, stored in the memory 712 may be one or more of the following modules. These modules may be executed as foreground applications, background tasks, daemons, and so forth. A presentation module 716 may be configured to present the user interface 506, the notifications 120(1), 120(2), 120(3), ..., 120(D), 222, 420, and so forth. For example, the presentation module 716 may comprise a web browser. The presentation module 716 will be described in more detail in FIG. 8.

The memory 712 may also include the user account module 112 and 612. The user account module 112 may include the preference data, as described above. For example, the merchant data 110 may indicate activity information that is business related, such as a particular item is out of stock. The user account module 112 may access the preference data and determine that business related notifications may be sent to particular user devices associated with a business, may be passcode protected, have a preferred period of time to receive business related notifications, and so forth. The user account module 112 may generate user information 114 and 614. The user information 114 may indicate the preferred distribution of notifications.

The memory 712 may also include the notification module 116. The notification module 116 may be configured to generate notifications 120(1), 120(2), . . . , 120(D), as described above. The notification module 116 may generate the notifications 120(1), 120(2), . . . , 120(D) based on the user information 114 and the merchant data 110. For example, the merchant data 110 may indicate that the notification 120(1) may be business related or of sensitive material. The user information 114 may indicate that such notifications may be passcode protected. The notification module 116 may generate the notification 120(1) so that when a user views the notifications 120 they will be prompted to enter a passcode.

The memory 712 may include the prioritization module 124. The prioritization module 124 may determine a prioritized order to send the notifications 120(1), 120(2), . . . , 120(D), as described above. For example, the notification information 122 may indicate that the notification 120(1) corresponds to business related information, that the notification 120(2) corresponds to social media information, and the notification 120(3) corresponds to a public safety alert. In this example, the notification information 122 may include the user information 114. The user information 114 may indicate that notifications that correspond to public safety are sent first, the business-related notifications, and then general notifications, such as social media. In this example, the prioritization module 124 may determine that the notification 120(3) is sent first, then the notification 120(1) and then the notification 120(2).

The memory 712 may also include the communication module 128. The communication module 128 may be configured to send the notifications 120(1), 120(2), . . . , 120(D) to the user device 102, as described above. The communication module 128 may send the notifications 120(1), 120 (2), . . . , 120(D) based on the prioritized notification information 126. For example, the communication module 128 may have in a queue the notification 120(1) that corresponds to business related information, the notification 120(2) that corresponds to social media information, and the notification 120(3) that corresponds to a public safety alert. In this example, the prioritized notification information 126 may indicate that the notification 120(3) is to be sent first, then the notification 120(1) and then the notification 120(2).

The memory 712 may also include a datastore 718 to store information. The datastore 718 may use a flat file, database, linked list, tree, executable code, or other data structure to store the information. In some implementations, the datastore 718 or a portion of the datastore 718 may be distributed across one or more user device 102, 224(1), 224(2), 224(3), . . . , 224(D), 404, 406, 504, 602, the merchant server 108, 608, the server 410, the notification distribution server 630, network attached storage apparatus, and so forth.

The datastore 718 may store the heartbeat data 104, the merchant data 110, the user information 114, the notification information 122, the prioritized notification information 126, the notification 120(1), 120(2), 120(3), . . . , 120(D), confirmation data 130, request data 412, broadcast data 418, or a combination thereof. As described above, the heartbeat data 104 may indicate that the user device 102 is connected to a network. The merchant data 110 may be indicative of activity information associated with the merchant account, as described above. The user information 114, as described above, may indicate the preferred distribution of notifications. For example, the user information 114 may indicate, as described above, a preferred user device to send the notification to. The notification information 122, as described above, may be the activity information that was included in the merchant data 110. In other implementations, the notification information 122 may indicate the type of information included in the notifications 120(1), 120(2), . . . , 120(D). For example, the notification information 122 may indicate that the notifications 120(1), 120(2), . . . , 120(D) may indicate that a particular item is out of stock, a fraud alert, receipt of a large order, payment information, purchase information, shipping information, and so forth. The prioritized notification information 126, as described above, may indicate the determined prioritized order. The notification 120(1), 120(2), 120(3), . . . , 120(D), as described above, may indicate that a particular item is out of stock, a fraud alert, receipt of a large order, payment information, purchase information, shipping information, and so forth. The confirmation data 130, as described above, may indicate that the user device 102 received or presented the notification 120(1), 120(2), 120(3), . . . , 120(D). The request data 412, as described above, may cause the user device 406 to send broadcast data 414. The broadcast data 414 may indicate a request to send notifications. The broadcast data 414 may also indicate a request for the user device 406 to connect to the user device 404.

Figure 8:
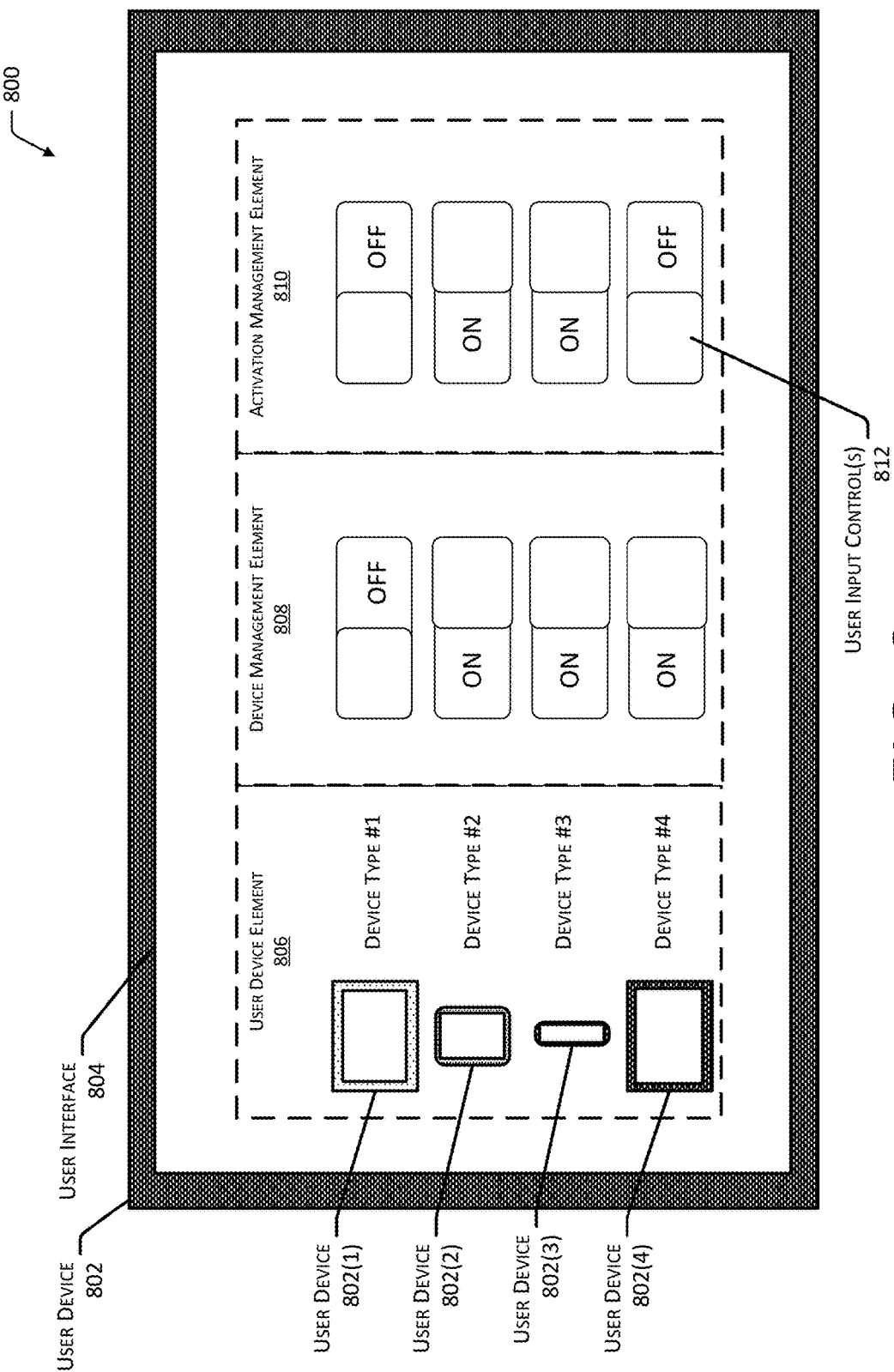
FIG. 8 is an example of a user interface for user device management.

FIG. 8 depicts an example 800 of a user interface for user device management. For example, a user device 802 may be one of the user device 102, 224(1), 224(2), 224(3), . . . , 224(D), 404, 406, 504, or 602, as described above. The presentation module 716 may cause the user device 802 to provide a user interface 804. The user interface 804 may display one or more of user device elements 806, device management elements 808, activation management elements 810, and user input controls 812. The display of the elements 806, 808, and 810 may enable a user to manage the user devices 802(1), 802(2), 802(3), 802(4), . . . , 802(D) associated with the merchant account. For example, the user interface 804 may display the user device element 806 which lists the user devices 802(1), 802(2), 802(3), 802(4), . . . , 804(D) associated with the merchant account.

The device management element 808 may include the user input control(s) 812 that enable a user to add or remove the user devices 802(1), 802(2), 802(3), 802(4), . . . , 804(D) associated with the merchant account. The user input control(s) 812 may be a switch that enables the user to toggle between two mutually exclusive states, such as on and off. For example, the user device 802(1) may be broken and the user would like to remove the user device 802(1) from the merchant account. The user interface 804 may receive a user input to change the state of the user input control(s) 812 from "on" to "off." The "on" state may indicate that the user has added or would like to have the particular user device associated with the merchant account. The "off" state may indicate removal of the particular user device 802 from the merchant account. Input data representative of the user manipulation of the user input controls 812 may be sent to the notification management server 106 or other servers.

The activation management element 810 may include the user input control(s) 812 that enables a user to have particular user devices 802 active to receive notifications and particular user devices inactive to omit receiving notifications. The user input control(s) 812 may be a switch that enables the user to toggle between two mutually exclusive states, such as on and off. For example, the user interface 804 may receive a user input to change the state of the user input control(s) 812 from "on" to "off." The "on" state may indicate that a particular user device may receive notifications. The "off" state may indicate that a particular user device 802 may be omitted from receiving notifications. In this example, the user interface 804 may receive a user input to deactivate the user device 802(4) from receiving notifications. Input data representative of the user manipulation of the user input controls 812 may be sent to the notification management server 106 or other servers.

Figure 9:
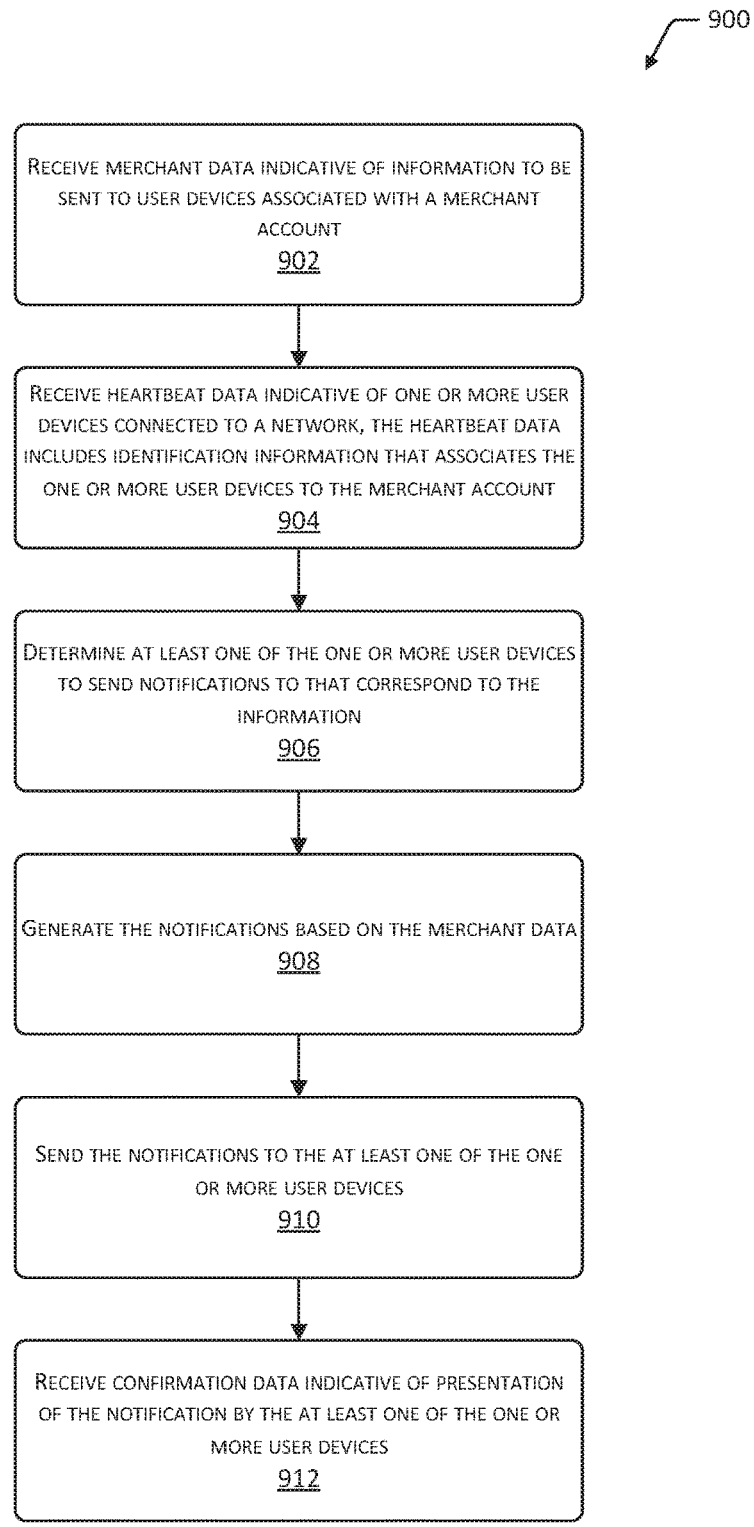
FIG. 9 depicts a flow diagram of a process for notification management.

FIG. 9 depicts a flow diagram of a process 900 for notification management. Although the process 900 is described with reference to the flowchart illustrated in FIG. 9, many other methods of performing the acts associated with the process 900 may be used. For example, the order of the steps may be changed, some of the steps described may be optional, and additional steps may be included.

At 902, the notification management server 106 may receive the merchant data 110 indicative of information to be sent to user devices 102 associated with a merchant account. The merchant server 108 may send merchant data 110 to the notification management server 106, as described above. The merchant data 110 may be indicative of activity information associated with the merchant account. For example, the activity information may indicate that a particular item is out of stock, a fraud alert, receipt of a large order, payment information, purchase information, shipping information, and so forth.

At 904, the notification management server 106 may receive the heartbeat data 104 indicative of one or more user devices 102 connected to a network. The heartbeat data 104 may include identification information that associates the one or more user devices to the merchant account.

At 906, the notification management server 106 may determine at least one of the one or more user devices 102 to send the notifications 120(1), 120(2), 120(3), . . . , 120(D) to that correspond to the identification information. The notification management server 106, upon receipt of the merchant data 110 may access the user account module 112. The user account module 112 may include the preference data, as described above. For example, the merchant data 110 may indicate activity information that is business related, such as a particular item is out of stock. The user account module 112 may access the preference data and determine that business related notifications may be sent to particular user devices 102 associated with a business, may be passcode protected, preferred period of time to receive business related notifications, and so forth. The user account module 112 may generate user information 114. The user information 114 may indicate the preferred distribution of notifications. For example, the user information 114 may indicate, as described above, a preferred user device 102 to send the notification to, a preferred period of time to send the notification, a security protocol when sending the notifications, a priority hierarchy for sending the notification, and so forth.

At 908, the notification management server 106 may generate the notifications 120(1), 120(2), 120(3), . . . , 120(D) based on the merchant data 110. The notification management server 106 may access the notification module 116. The notification module 116 may be configured to generate notifications 120(1), 120(2), . . . , 120(D), as described above. The notification module 116 may generate the notifications 120(1), 120(2), . . . , 120(D) based on the user information 114 and the merchant data 110. For example, the merchant data 110 may indicate that the notification 120(1) may be business related or of sensitive material. The user information 114 may indicate that such notifications may be passcode protected. The notification module 116 may generate the notification 120(1) so that when a user views the notification 120(1) they will be prompted to enter a passcode, as described above.

At 910, the notification management server 106 may send the notifications to the at least one of the one or more user devices 102. The notification management server 106 may access the communication module 128. The communication module 128 may be configured to send the notifications 120(1), 120(2), . . . , 120(D) to the user device 102. The communication module 128 may send the notifications 120(1), 120(2), . . . , 120(D) based on the prioritized notification information 126. For example, the communication module 128 may have in a queue the notification 120(1) that corresponds to business related information, the notification 120(2) that corresponds to social media information, and the notification 120(3) that corresponds to a public safety alert. In this example, the prioritized notification information 126 may indicate that the notification 120(3) is to be sent first, then the notification 120(1) and then the notification 120(2).

At 912, the notification management server 106 may receive the confirmation data 130 indicative of presentation of the notifications 120(1), 120(2), . . . , 120(D) by the at least one of the one or more user devices 102. For example, the confirmation data 130 may indicate that the user device 102 at least received the notification 120(1). In another example, the confirmation data 130 may indicate the presentation of the notification 120(1) by the user device 102. In this example, the notification 120(1) may be a friend's confirmation to a party. The user device 102 may receive a user input to present the notification 120(1). The user device 102 upon presenting the notification 120(1) either verbally as a verbal command provided by the user device 102, via a speaker 708(3), visually as presented on a display device 708(4) associated with the user device 102, or a combination thereof, may send the confirmation data 130 to the notification management server 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device)

to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A device comprising:
   a memory storing computer-executable instructions; and
   at least one processor in communication with the memory, the at least one processor executes the computer-executable instructions to:
      receive preference data that designates preferred distribution of a notification associated with a merchant account, the preferred distribution indicates one or more of:
         a preferred user device to send the notification,
         a period of time to send the notification,
         a security protocol to protect information included in the notification, or a priority hierarchy for sending the notification;
      receive heartbeat data indicative of a user device connected to a network and identification information that associates the user device to the merchant account;
      receive merchant data indicative of activity information associated with the merchant account;
      generate the notification based on the merchant data;
      based on the preference data and receipt of the heartbeat data, send the notification corresponding to the activity information to the user device; and
      receive confirmation data indicative of presentation of the notification by the user device.

2. The device of claim 1, wherein the at least one processor of the device further executes the computer-executable instructions to:
   determine that the activity information indicates a first notification and a second notification;
   determine that the first notification includes restricted information;
   determine that the second notification includes general information;
   determine that the first notification is to be sent to a first user device associated with the merchant account;
   determine that the second notification is to be sent to the first user device and a second user device associated with the merchant account;
   send the first notification to the first user device;
   send the second notification to the first user device and the second user device;
   receive first confirmation data indicative of a first presentation receipt of the first notification; and
   receive second confirmation data indicative of the presentation of the notification by the first user device or the second user device.

3. The device of claim 1, wherein the notification comprises one or more of:
   fraud information indicative of malicious activity associated with the merchant account;
   inventory information indicative of a remaining quantity for a particular item;
   order information indicative of a purchase order for an item that includes a payment method, shipment method, or quantity; or
   public safety alert information associated with a location proximate to the user device.

4. A method comprising:
   receiving first data indicative of first information to be sent to user devices associated with a merchant account;
   receiving second data indicative of one or more user devices connected to a network, the second data includes second information that associates the one or more user devices to the merchant account;
   determining at least one of the one or more user devices to send notifications that correspond to the first information;
   generating the notifications based on the first data;
   sending the notifications to the at least one of the one or more user devices; and
   receiving confirmation data indicative of presentation of the notifications by the at least one of the one or more user devices.

5. The method of claim 4, further comprising:
   in response to not receiving the confirmation data within a period of time from sending the notifications, storing the notifications;
   receiving the second data indicative of the at least one of the one or more user devices being connected to the network;
   sending the stored notifications to the at least one of the one or more user devices; and
   receiving the confirmation data indicative of the presentation of the notifications by the at least one of the one or more user devices.

6. The method of claim 4, further comprising:
   accessing third data that designates preferred distribution of the notifications associated with the merchant account; and
   wherein determining the at least one of the one or more user devices to send the notifications is based on the third data.

7. The method of claim 4, wherein the first information indicates a first notification and a second notification, and wherein the method further comprising:
   receiving first confirmation data associated with the first notification;
   in response to not receiving delivery confirmation data associated with the second notification, store the second notification;

receiving the second data indicative of the at least one of the one or more user devices being connected to the network;

sending the second notification to the at least one of the one or more user devices; and receiving second confirmation data indicative of presentation of the second notification by the at least one of the one or more user devices.

8. The method of claim 4, wherein the first information indicates a first notification and a second notification, and wherein the method further comprising:

determining that the first notification includes restricted information;

determining that the second notification includes general information;

determining that the first notification is to be sent to a particular user device;

determining that the second notification is to be sent to the determined at least one of the one or more user devices;

sending the first notification to the particular user device; and sending the second notification to the determined at least one of the one or more user devices.

9. The method of claim 4, further comprising:

accessing third data that designates preferred distribution of the notifications associated with the merchant account;

determining a first user device that corresponds to a first determined channel;

determining a second user device that corresponds to a second determined channel;

determining the notifications to send to the first user device based on the third data;

determining the notifications to send to the second user device based on the third data; and wherein sending the notifications further comprises sending the determined notifications to the first user device and the second user device.

10. The method of claim 9, further comprising:

receiving first confirmation data indicative of presentation of the notifications by the first user device;

in response to not receiving second confirmation data from the second user device, storing the determined notifications associated with the second user device;

receiving the second data indicative of the second user device being connected to the network;

sending the stored determined notifications to the second user device; and receiving the second confirmation data indicative of the presentation of the stored determined notifications by the second user device.

11. A system comprising:

a device comprising:

a memory storing computer-executable instructions; and at least one processor in communication with the memory, the at least one processor executes the computer-executable instructions to:

receive first data indicative of one or more user devices connected to a network and first information that associates the one or more user devices to a merchant account;

receive second data indicative of second information to be sent to the one or more user devices associated with the merchant account;

access third data that designates a preferred distribution of a notification associated with the merchant account;

determine, based on the third data, the one or more user devices to send the notification to; and send the notification to the one or more user devices.

12. The system of claim 11, wherein the at least one processor of the device further executes the computer-executable instructions to:

determine a location of the one or more user devices;

send request data to a second user device that is proximate to the one or more user devices, the request data indicative a request to send the notification;

send the notification to the second user device to be sent to the one or more user devices; and receive confirmation data indicative of presentation of the notification by the one or more user devices.

13. The system of claim 11, wherein the at least one processor of the device further executes the computer-executable instructions to:

in response to not receiving delivery confirmation of the notification, store the notification in a memory;

receive the first data indicative that the one or more user devices are connected to the network;

send the notification to the one or more user devices associated with the first data; and receive confirmation data indicative of presentation of the notification by the one or more user devices.

14. The system of claim 11, wherein the at least one processor of the device further executes the computer-executable instructions to:

determine a location of the one or more user devices;

determine a user device that is proximate to the location of the one or more user devices;

send the notification to the user device that is proximate to the location of the one or more user devices, the notification causes the user device to send the notification to the one or more user devices; and receive confirmation data indicative of presentation of the notification by the one or more user devices.

15. The system of claim 11, further comprising:

a user device comprising:

a memory storing computer-executable instructions; and at least one processor in communication with the memory, the at least one processor executes the computer-executable instructions to:

receive the notification;

present the notification via a display device associated with the user device;

receive user input indicating a confirmation that the notification has been presented; and send confirmation data to the device.

16. The system of claim 11, wherein sending the notification to the one or more user devices comprises the notification being restricted and causing the one or more user devices to present a user interface for receiving user inputs.

17. The system of claim 11, wherein the first information indicates a first notification and a second notification, and wherein the at least one processor of the device further executes the computer-executable instructions to:

determine an order to send the first notification and the second notification based on the third data; and send the first notification and the second notification in the determined order to the one or more user devices.

18. The system of claim 17, wherein the at least one processor of the device further executes the computer-executable instructions to:
- receive first confirmation data associated with the first notification;
- in response to not receiving second confirmation data associated with the second notification, store the second notification;
- determine a location of the one or more user devices;
- send a broadcast request to a second user device that is proximate to the one or more user devices, the broadcast request indicating a request to send the second notification;
- send the second notification to the second user device to be sent to the one or more user devices; and
- receive confirmation data of presentation of the second notification by the one or more user devices.

19. The system of claim 11, wherein the at least one processor of the device further executes the computer-executable instructions to:
- determine that information within the notification is restricted; and
- based on the third data, send the notification to a particular user device.

20. The system of claim 11, wherein the at least one processor of the device further executes the computer-executable instructions to:
- determine that information within the notification is restricted; and
- based on the third data, send the notification that is restricted at a particular time to a particular user device.

* * * * *